(12) United States Patent
Williamson

(10) Patent No.: US 8,417,734 B2
(45) Date of Patent: Apr. 9, 2013

(54) SYSTEMS AND METHODS FOR MANAGING SETS OF MODEL OBJECTS VIA UNIFIED MANAGEMENT INTERFACE

(75) Inventor: Eric Williamson, Holly Springs, NC (US)

(73) Assignee: Red Hat, Inc., Raleigh, NC (US)

( * ) Notice: Subject to any disclaimer, the term of this patent is extended or adjusted under 35 U.S.C. 154(b) by 378 days.

(21) Appl. No.: 12/551,393

(22) Filed: Aug. 31, 2009

(65) Prior Publication Data

US 2011/0055761 A1    Mar. 3, 2011

(51) Int. Cl.
G06F 7/00       (2006.01)
G06F 17/30      (2006.01)

(52) U.S. Cl. .................................................. 707/802
(58) Field of Classification Search .................. None
See application file for complete search history.

(56) References Cited

U.S. PATENT DOCUMENTS

| | | | |
|---|---|---|---|
| 5,890,167 A | 3/1999 | Bridge, Jr. et al. |
| 5,978,796 A | 11/1999 | Malloy et al. |
| 6,035,300 A | 3/2000 | Cason et al. |
| 6,360,188 B1 | 3/2002 | Freidman et al. |
| 6,366,922 B1 | 4/2002 | Althoff |
| 6,434,435 B1 | 8/2002 | Tubel et al. |
| 6,434,544 B1 | 8/2002 | Bakalash et al. |
| 6,594,672 B1 | 7/2003 | Lampson et al. |
| 6,609,123 B1 | 8/2003 | Cazemier et al. |
| 6,735,590 B1 | 5/2004 | Shoup et al. |
| 6,931,418 B1 | 8/2005 | Barnes |
| 7,039,871 B2 | 5/2006 | Cronk |
| 7,093,194 B2 | 8/2006 | Nelson |
| 7,139,766 B2 | 11/2006 | Thomson et al. |
| 7,152,062 B1 | 12/2006 | Draper et al. |
| 7,177,329 B2 | 2/2007 | Kobayashi |
| 7,240,067 B2 | 7/2007 | Timmons |
| 7,299,241 B2 | 11/2007 | Reed et al. |
| 7,660,822 B1 | 2/2010 | Pfleger |
| 7,716,257 B2 | 5/2010 | Thomson et al. |
| 2001/0049678 A1 | 12/2001 | Yaginuma |
| 2002/0029207 A1 | 3/2002 | Bakalash et al. |
| 2002/0035562 A1 | 3/2002 | Roller et al. |
| 2002/0083034 A1 | 6/2002 | Orbanes et al. |
| 2002/0087516 A1 | 7/2002 | Cras et al. |
| 2002/0169658 A1 | 11/2002 | Adler |
| 2003/0114950 A1 | 6/2003 | Ruth et al. |
| 2003/0115194 A1 | 6/2003 | Pitts et al. |
| 2003/0115207 A1 | 6/2003 | Bowman et al. |
| 2003/0120372 A1 | 6/2003 | Ruth et al. |

(Continued)

OTHER PUBLICATIONS

Using OLAP and Multi-Dimensional data for decision making, Hasan et al. IEEE 2001.

(Continued)

*Primary Examiner* — Usmaan Saeed
*Assistant Examiner* — Michele Choi
(74) *Attorney, Agent, or Firm* — Lowenstein Sandler LLP

(57) ABSTRACT

A computing system generates a model object from source data, the model object based on an extracted data element of the source data and an attribute of the extracted data element and generates a management interface representing the model object. The computing system provides at least one of a communications status or a security status of the model object via the management interface. The management interface is used to control how the model objects and other resources can exchange outputs, share internal data, and otherwise operate.

11 Claims, 6 Drawing Sheets

U.S. PATENT DOCUMENTS

| | | |
|---|---|---|
| 2003/0126114 A1 | 7/2003 | Tedesco |
| 2003/0184585 A1 | 10/2003 | Lin et al. |
| 2003/0225736 A1 | 12/2003 | Bakalash et al. |
| 2004/0039736 A1 | 2/2004 | Kilmer et al. |
| 2004/0133552 A1 | 7/2004 | Greenfield et al. |
| 2004/0139061 A1 | 7/2004 | Colossi et al. |
| 2004/0205617 A1 | 10/2004 | Light |
| 2004/0252136 A1 | 12/2004 | Bhatt et al. |
| 2005/0004904 A1 | 1/2005 | Kearney et al. |
| 2005/0010566 A1 | 1/2005 | Cushing et al. |
| 2005/0015220 A1 | 1/2005 | Ramchandi |
| 2005/0060252 A1 | 3/2005 | Doddington |
| 2005/0060382 A1 | 3/2005 | Spector et al. |
| 2006/0004833 A1 | 1/2006 | Trivedi et al. |
| 2006/0024653 A1 | 2/2006 | Battagin et al. |
| 2006/0036707 A1 | 2/2006 | Singh et al. |
| 2006/0136462 A1 | 6/2006 | Campos et al. |
| 2006/0173906 A1 | 8/2006 | Chu et al. |
| 2006/0190844 A1 | 8/2006 | Binder et al. |
| 2006/0262145 A1 | 11/2006 | Zhang et al. |
| 2007/0022093 A1 | 1/2007 | Wyatt et al. |
| 2007/0027904 A1 | 2/2007 | Chow et al. |
| 2007/0088757 A1 | 4/2007 | Mullins et al. |
| 2007/0094236 A1 | 4/2007 | Otter et al. |
| 2007/0150820 A1 | 6/2007 | Salvo |
| 2007/0208721 A1 | 9/2007 | Zaman et al. |
| 2007/0211056 A1* | 9/2007 | Chakraborty et al. ........ 345/440 |
| 2008/0140696 A1 | 6/2008 | Mathuria |
| 2008/0172405 A1 | 7/2008 | Feng et al. |
| 2008/0243778 A1 | 10/2008 | Behnen et al. |
| 2008/0294596 A1 | 11/2008 | Xiong |
| 2008/0320023 A1 | 12/2008 | Fong |
| 2009/0006992 A1 | 1/2009 | Gilboa |
| 2009/0172042 A1 | 7/2009 | Bracha et al. |
| 2009/0193039 A1 | 7/2009 | Bradley et al. |
| 2009/0222470 A1 | 9/2009 | Kemp et al. |
| 2009/0254572 A1 | 10/2009 | Redlich et al. |
| 2010/0057700 A1 | 3/2010 | Williamson |
| 2010/0057777 A1 | 3/2010 | Williamson |
| 2010/0131456 A1 | 5/2010 | Williamson |
| 2010/0169299 A1 | 7/2010 | Pollara |
| 2010/0305922 A1 | 12/2010 | Williamson |
| 2010/0306254 A1 | 12/2010 | Williamson |
| 2010/0306255 A1 | 12/2010 | Williamson |
| 2010/0306272 A1 | 12/2010 | Williamson |
| 2010/0306281 A1 | 12/2010 | Williamson |
| 2010/0306340 A1 | 12/2010 | Williamson |
| 2010/0306682 A1 | 12/2010 | Williamson |
| 2011/0050728 A1 | 3/2011 | Williamson |
| 2011/0054854 A1 | 3/2011 | Williamson |
| 2011/0055680 A1 | 3/2011 | Williamson |
| 2011/0055761 A1 | 3/2011 | Williamson |
| 2011/0055850 A1 | 3/2011 | Williamson |
| 2011/0078199 A1 | 3/2011 | Williamson |
| 2011/0078200 A1 | 3/2011 | Williamson |
| 2011/0131176 A1 | 6/2011 | Williamson |
| 2011/0131220 A1 | 6/2011 | Williamson |
| 2011/0158106 A1 | 6/2011 | Williamson |
| 2011/0161282 A1 | 6/2011 | Williamson |
| 2011/0161374 A1 | 6/2011 | Williamson |
| 2011/0161378 A1 | 6/2011 | Williamson |

OTHER PUBLICATIONS

A new OLAP aggregation based on the AHC technique, Massaoud et al, DOLAP'04 Nov. 12-13, 2004.

Interactive hierarchical dimension ordering, spacing and filtering for exploration of high dimension datasets, Yang et al, IEEE symposium on information visualization 2003.

Williamson, "Systems and Methods for Interpolating Conformal Input Sets Based on a Target Output", U.S. Appl. No. 12/872,779, filed Aug. 31, 2010.

Williamson, "Systems and Methods for Interpolating Alternative Input Sets Based on User-Weighted Variables". U.S. Appl. No. 12/951,881, filed Nov. 22, 2010.

Williamson, "Systems and Methods for Tracking Differential Changes in Conformal Data Input Sets", U.S. Appl. No. 12/951,937, filed Nov. 22, 2010.

Williamson, "Systems and Methods For Training a Self-Learning Netvvork Using Interpolated Input Sets Based on a Target Output", U.S. Appl. No. 12/872,935, filed Aug. 31, 2010.

Williamson, "Systems and Methods For Embedding Interpolated Data Object in Application Data File", U.S. Appl. No. 12/966,717, filed Nov. 29, 2010.

Williamson, "Systems and Methods For Generating Interpolated Input Data Sets Using Reduced Input Source Objects", U.S. Appl. No. 12/955,768, filed Nov. 29, 2010.

Williamson, "Systems and Methods for Filtering Interpolated Input Data Based on User-Supplied or Other Approximation Constraints", U.S. Appl. No. 12/955,790, filed Nov. 29, 2010.

Williamson, "Systems and Methods For Binding Multiple Interpolated Data Objects", U.S. Appl. No. 12/955,811, filed Nov. 29, 2010.

Williamson, "Systems and Methods For Generating Portable Interpolated Data Using Object Based Encodig of Interpolated Results", U.S. Appl. No. 13/037,322, filed Feb. 28, 2011.

Williamson, "Systems and Methods For Generating Interpolation Data Template to Normalize Analytic Runs", U.S. Appl. No. 13/037,332, flied Feb. 28, 2011.

Williamson, "Systems and Methods For Generating Interpolation Data Sets Converging to Optimized Results Using Iterative Overlapping Inputs", U.S. Appl. No. 13/037,341, filed Feb. 28, 2011.

Williamson, "Systems and Methods For Validating Interpolation Results Using Monte Carlo Simulations on Interpolated Data Inputs", U.S. Appl. No. 13/037,344, filed Feb. 28, 2011.

Aspfaq.com, "What are the valid styles for converting datetime to string?", (2006) http://database.aspfaq.com/database/what-are-the-valid-styles-for-converting-datetime-to-string.html.

Answering Joint Queries from Multiple Aggregate OLAP Databases, Pourabbas et al, LNCS 2737, pp. 24-34, 2003.

Williamson, "Systems and Methods for Generating Sets of Model Objects Having Data Messaging Pipes", U.S. Appl. No. 12/551,428, filed Aug. 31, 2009.

USPTO Office Action for U.S. Appl. No. 12/475,439 mailed Apr. 29, 2011.

USPTO Office Action for U.S. Appl. No. 12/475,439 mailed Nov. 10, 2010.

USPTO Office Action for U.S. Appl. No. 12/475,441 mailed Jul. 25, 2011.

USPTO Office Action for U.S. Appl. No. 12/475,459 mailed Jun. 6, 2011.

USPTO Office Action for U.S. Appl. No. 12/475,460 mailed Aug. 15, 2011.

USPTO Office Action for U.S. Appl. No. 12/475,458 mailed Jul. 5, 2011.

USPTO Office Action for U.S. Appl. No. 12/475,458 mailed Nov. 25, 2011.

USPTO Office Action for U.S. Appl. No. 12/475,452 mailed Aug. 12, 2011.

USPTO Office Action for U.S. Appl. No. 12/551,330 mailed Dec. 7, 2011.

USPTO Office Action for U.S. Appl. No. 12/475,439 mailed Feb. 22, 2012

USPTO Office Action for U.S. Appl. No. 12/475,441 mailed May 7, 2012.

USPTO Office Action for U.S. Appl. No. 12/475,459 mailed Feb. 28, 2012.

USPTO Office Action for U.S. Appl. No. 12/475,460 mailed Apr. 19, 2012.

USPTO Office Action for U.S. Appl. No. 12/475,419 mailed Feb. 22, 2012.

USPTO Office Action for U.S. Appl. No. 12/475,458 mailed Mar. 9, 2012.

USPTO Office Action for U.S. Appl. No. 12/475,452 mailed May 16, 2012.

USPTO Office Action for U.S. Appl. No. 12/551,428 mailed Mar. 30, 2012.

USPTO Office Action for U.S. Appl. No. 12/551,330 mailed Jun. 13, 2012.

* cited by examiner

SYSTEMS AND METHODS FOR MANAGING SETS OF MODEL OBJECTS VIA UNIFIED MANAGEMENT INTERFACE

RELATED APPLICATION

The subject matter of this application is related to the subject matter of U.S. application Ser. No. 12/551,428 (U.S. Publication No. 2011/0055850;) filed Aug. 31, 2009, entitled "Systems and Methods for Generating Sets of Model Objects Having Data Messaging Pipes," filed of even date with this application, having the same inventor as this application, being assigned or under obligation of assignment to the same entity as this application, and which application is incorporated by reference in its entirety.

FIELD

The present teachings relate to systems and methods for managing sets sets of model objects via a unified management interface, and more particularly to platforms and techniques for dedicated modeling of technical, medical, financial, and other systems which include a graphical management interface permitting the activation, connection, and/or other manipulation of model objects using a selective dashboard-type control facility.

BACKGROUND OF RELATED ART

A spectrum of modeling platforms and options exist today for engineers, managers, developers and other professionals. In the case of engineering, medical, technical, financial, and other advanced modeling resources, a range of platforms are available for users interested in setting up, running and maintaining financial modeling systems. For example, organizations interested in relatively sophisticated modeling applications, such as geophysical models for detecting oil reserves or other geologic features or equity market analysis based on Black-Sholes option pricing models, a company or other organization may choose to install advanced modeling software on mainframe-class computers to run those classes of models and obtain various projections, reports, and other results. Such mainframe platform, data center and related installations, however, can involve costs on the order of millions of dollars or more, and may require the full time attention of highly skilled professionals, including programmers and managers with advanced training. As a consequence, putting a mainframe-based modeling operation into place may not be practical or possible for many organizations or users.

On the other end of the spectrum, managers, engineers and others may employ widely available entry-level applications to capture operational data and attempt to develop predictive models for engineering, financial, medial, and other applications. That class of applications can include, for example, consumer or business-level spreadsheet, database, or data visualization programs for technical, financial, and other purposes. For instance, a manager of a manufacturing facility may use a commercially available spreadsheet application to enter production numbers, schedules, and other details of that site. However, attempting to extract useful modeling outputs from those classes of applications can be difficult or impossible. For one, spreadsheet, database, and other widely available applications are typically built to produce reports based on already existing data, but not to generate modeling outputs or objects that represent predictive outputs or scenarios. For another, existing spreadsheet, database, and other applications typically involve limitations on cell size, number of dimensions, overall storage capacity, and other program parameters which, in the case of large-scale modeling operations, may be insufficient to operate on the data sets necessary to produce and run meaningful models.

For another, the data structures and outputs of existing spreadsheet, database and other entry-level or commonly available applications are typically arranged in proprietary format, rather than a widely interoperable object-based or other universal format. As still another drawback, the cells, rows, columns, and other data elements within commonly available spreadsheets, databases, and other entry-level programs can not be extracted as separate units and exported to other modeling or analytic tools. In further regards, conventional tools fail to permit a user to insert or establish message pipes or other connections or relationships between model objects that permit those objects to transmit and exchange data, such as reports or other computations, between themselves. In yet further regards, conventional platforms afford no unified interface to permit the selection, activation, connection, and/or other manipulation of sets of model objects via a graphical or dashboard-type control facility. In short, the use of spreadsheet, database, and other consumer or business-level applications to conduct modeling operations involves significant shortcomings, due in part to the fact that those classes of platforms are not designed to reliable handle modeling functionality. At present, therefore, a manager, developer, engineer, or other professional or user with modeling requirements is faced with a choice between installing a large and expensive mainframe-based solution with its attendant infrastructure, a spreadsheet or database-based entry level solution with its attendant limitations on power and data handling, or a combination of those two types of platforms. It may be desirable to provide object-based or object-compatible modeling platforms capable of generating a set of modeling objects which encapsulate various modeling features, and which objects can be manipulated via a unified management interface.

DESCRIPTION OF THE DRAWINGS

The accompanying drawings, which are incorporated in and constitute a part of this specification, illustrate embodiments of the present teachings and together with the description, serve to explain the principles of the present teachings. In the figures.

DESCRIPTION OF EMBODIMENTS

Figure 1:
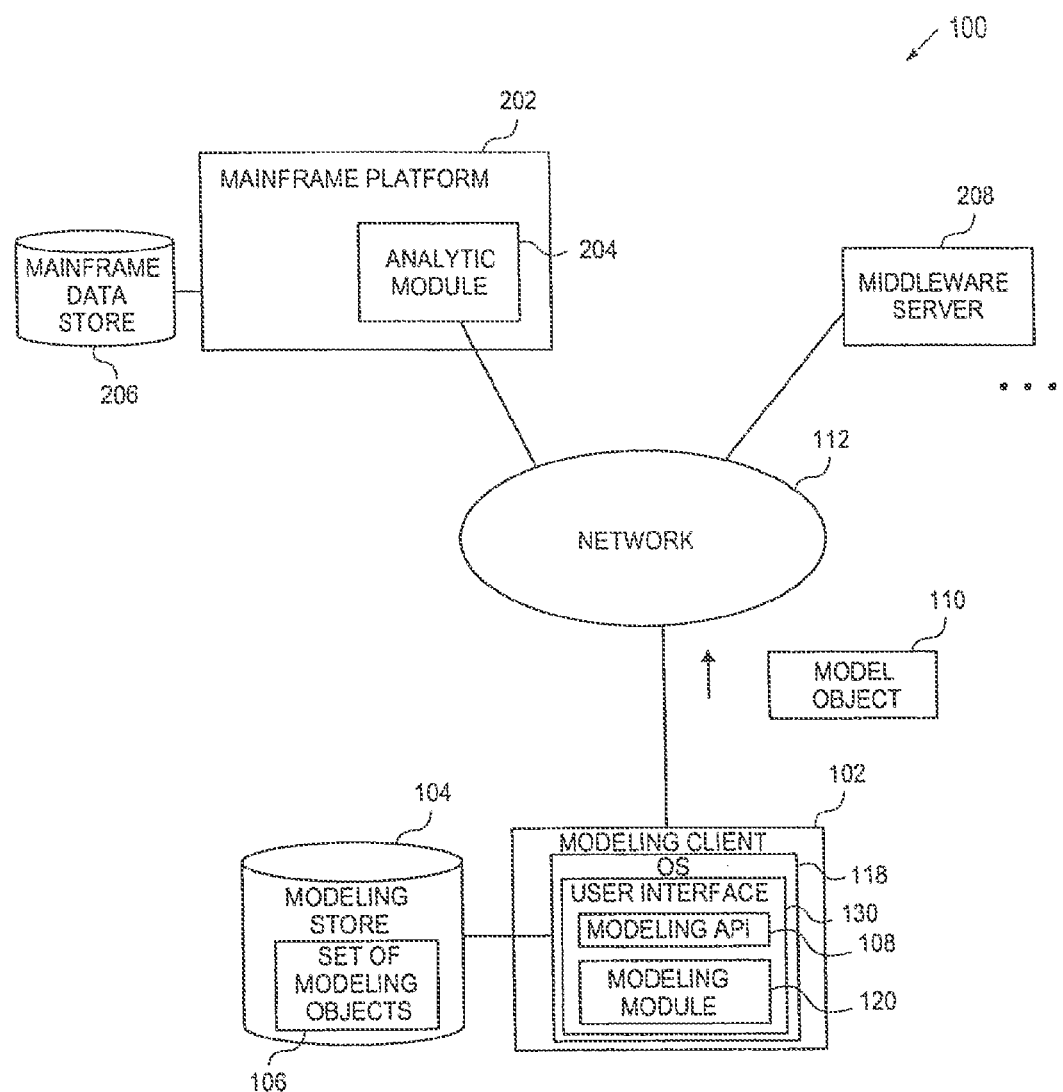
FIG. 1 illustrates an overall system for a modeling network including various hardware and connectivity resources that can be used in systems and methods for managing sets of modeling objects via a unified management interface, according to various embodiments of the present teachings.

Embodiments of the present teachings relate to systems and methods for managing sets of modeling objects via a unified management interface. More particularly, embodiments relate to platforms and techniques that can access, extract, and generate modeling objects in a native object-based or object-compatible format. The modeling objects produced via a modeling client or other modeling tool according to the present teachings can encapsulate both source data describing a physical, medical, technical, financial, or other process or phenomena, and modeling attributes that relate the source data to predictive scenarios, specific models, and other features. In embodiments, the modeling objects can be extracted or "lifted" from data sources such as database programs or others, and stored to local storage of a local modeling client.

The resulting set or sets of model objects can incorporate data pipes established between any two or more selected model objects, as well as other connections, channels or relationships between individual objects. In aspects in various regards, model objects can be connected via data messaging pipes such as those described in the aforementioned co-pending U.S. application Ser. No. 12/551,428 (U.S. Publication No. 2011/0055850) filed Aug. 31, 2009, entitled "Systems and Methods for Generating Sets of Model Objects Having Data Messaging Pipes,". In aspects, the data that the model objects exchange can include reports or outputs generated by the model objects and/or associated applications or other resources, such as databases, spreadsheets, matrices, or other numerical, textual, logical, or other results. In aspects, the set of model objects can thereby access, share, and exchange computations, results, and other outputs as well as internally stored data, functions, procedures, and other processes or services.

According to aspects, the set of model objects along with their associated pipe networks can be made visible or available via a unified management interface presented on the desktop or other user interface of the modeling client, or elsewhere. The management interface can, in various regards, allow a user to configure, monitor, and/or maintain various operations related to the sets of model objects. These and other embodiments described herein address the various noted shortcomings in known modeling technology, and provide a user or operator with enhanced modeling power on a desktop or other client, allowing active and comprehensive management of the configuration and operation of sets of model objects. Systems and methods according to the present teachings also allow seamless generation, local storage, and communication of model objects and their interconnections to backend mainframe platforms, data centers, middleware servers, other modeling clients, and/or other local or remote modeling, storage, or data processing resources.

Reference will now be made in detail to exemplary embodiments of the present teachings, which are illustrated in the accompanying drawings. Where possible the same reference numbers will be used throughout the drawings to refer to the same or like parts.

FIG. 1 illustrates an overall network 100 in which systems and methods for managing sets of modeling objects via a unified management interface can be implemented, consistent with various embodiments of the present teachings. In embodiments as shown, a modeling client 102 can communicate with a variety of local and remote resources, including an mainframe platform 202 via one or more network 112. Modeling client 102 can be or include, for instance, a personal computer, a server, a dedicated workstation, a mobile device, or other machine, device, hardware, or resource. One or more network 112 can be or include, for example, the Internet, a virtual private network (VPN), a local area network such as an Ethernet™network, or other public or private network or networks. Mainframe platform 202 can be or include commercially available platforms or installations, such as, merely for example, mainframe or enterprise platforms available from SAP Inc. of Walldorf, Germany, and other sources.

Mainframe platform 202 can include modules, logic, and functionality to perform an array of computation and data storage tasks, including data warehousing, data mining, statistical analyses, financial planning, inventory management, customer resource management, engineering design, and other applications. In implementations as shown, mainframe platform 202 can host or communicate with a variety or resources including, merely illustratively, a mainframe data store 206, and logic or applications including an analytic module 204. Mainframe platform 202 can contain, host, support, or interface to other data processing hardware, software, and other resources. In embodiments, modeling client 102 can likewise communicate with other local or remote resources, such as a middleware server 208 hosting or interfacing to a set of data stores for online analytical processing (OLAP) or other functions. Modeling client 102 can also communicate or interface with other local or remote servers, services, data stores, or other resources.

In embodiments as shown, modeling client 102 can operate under an operating system 118, such as a distribution of the Linux™, Unix™, or other open source or proprietary operating system. Modeling client 102 can present a user interface 130, such as a graphical user interface or command line interface, operating under operating system 118 to receive commands and inputs from a user, and operate modeling client 102. Modeling client 102 can communicate with storage resources including a modeling store 104, such as a local or remote database or data store. Modeling store 104 can store a set of modeling objects 106, in which data, functions, procedures, attributes, and/or other information related to one or more modeling object 110 can be encapsulated and stored. In embodiments, modeling object 110 can be encoded in extensible markup language (XML) format. In embodiments, modeling object 110 can be encoded in other object-based or object-compatible formats or data structures. Modeling client 102 can communicate with mainframe platform 202 via a modeling application programming interface (API) 108. Modeling application programming interface (API) 108 can include, for instance, defined function calls or calls to other routines, calculations, or features, as well as data structures and parameters associated with modeling operations. For example, modeling application programming interface (API) 108 can include a function call to invoke a Monte Carlo simulation model based on a set of supplied data, such as an identified set of dimensions extracted from a spreadsheet or database. Other functions, routines, resources, and features can be called, invoked, or instantiated via modeling application programming interface (API) 108. According to embodiments in various regards, one or more local or remote modeling packages, modules, or other supporting applications can be instantiated via modeling module 120 and modeling application programming interface (API) 108 to manipulate source data and resulting one or more modeling object 110.

In embodiments, a user of modeling client 102 can access, modify, or add data modeling objects to a set of data modeling object 106 via a modeling module 120 hosted in modeling client 102. Set of data modeling objects 106 can include data objects that the user of modeling client 102 has directly entered, or, in aspects, which the user of modeling client has imported or extracted from sources such as consumer or business-level spreadsheet, database, and/or other applications or platforms. Modeling module 120 can itself be or include applications, software modules or hardware modules, or other logic or resources to operate on set of modeling objects 106. Modeling module 120 can, merely illustratively include or access logic or modules for invoking and manipulating a variety of scientific, technical, engineering, medical, financial, manufacturing, or other modeling operations. For instance, modeling module 120 can be or include applications or logic for performing Monte Carlo simulations, finite element analyses, Black-Scholes option pricing or other market analyses, epidemiological projections, geophysical models or simulations, or other simulations, models, trend mappings, projections, or other predictive processes. In embodiments in one regard, after invoking modeling module 120 and performing any modeling task, the user of modeling client 102 can locally store and/or export one or more modeling object 110 to external platforms or resources.

In embodiments as shown, the user of modeling client 102 can for instance export or communicate one or more modeling object 110 to mainframe platform 202 via modeling application programming interface (API) 108, for storage and use at a local or remote location from within that platform. In aspects, mainframe platform 202 can receive modeling object 110 directly, without a necessity for translation, re-formatting, or invoking any spreadsheet, database, or other application from which data encapsulated in one or mode modeling object 110 originated. In aspects, mainframe platform 202 can operate on one or more modeling object 110, and transmit or return that data or other results to modeling client 102 via modeling application programming interface (API) 108. Thus, according to aspects of the present teachings, modeling objects can be exchanged directly and programmatically between modeling client 102, mainframe platform 202 or other larger-scale or remote platforms, including for instance middleware server 208 or other comparatively large-scale or higher-capacity modeling or analytic tools.

Figure 2:
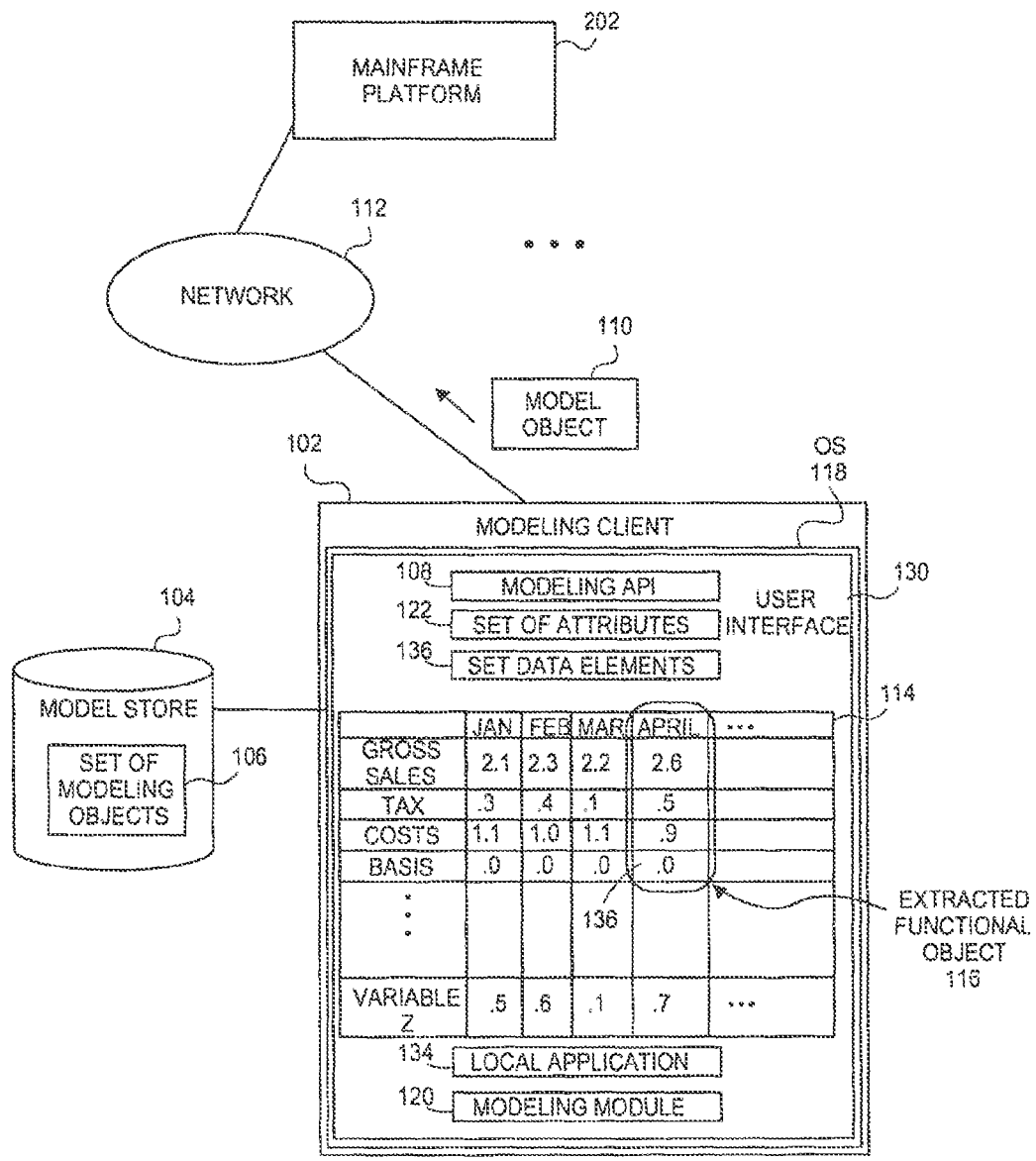
FIG. 2 illustrates an exemplary modeling network including a modeling server and connectivity resources, according to various embodiments.

In terms of operating on source data and generating one or more modeling object 110 for local storage and/or exchange with mainframe platform 202 or other platforms, and as shown for instance in FIG. 2, according to various embodiments, a user of modeling client 102 can invoke modeling module 120 to manipulate a set of source data 114 to identify, configure, and/or extract the functional objects, attributes, or other features of a set of data to produce a modeling output. In embodiments as shown, modeling module 120 can access a set of source data 114, from which data, attributes, and/or other metadata can be extracted to generate one or more modeling object 110. In aspects, set of source data 114 can be generated, hosted, or stored by or in a local application 134, such as a spreadsheet, database, accounting, word processing, presentation, or other application or software. In aspects, set of source data 114 can comprise data previously or newly generated in the form of an object-based modeling object, such as a modeling object entered, imported, or specified by the user of modeling client 102. In aspects, set of source data 114 can comprise data originally stored or generated in a consumer or business-level spreadsheet, database, and/or other application or software. In aspects, set of source data 114 can be initially formatted or encoded in a non-object oriented format, such as in a cellular array or in a relational database format. In aspects, set of source data 114 can be initially formatted or encoded in an object-oriented format, such as extensible markup language (XML) format. In aspects, a user of modeling client 102 can highlight, select, or otherwise specify all or a portion of set of source data 114 to generate one or more extracted functional object 116. For instance, a user can highlight a column of set of source data 114 to identify and extract data as well as functional relationships of interest, to the user, as a unified object. Thus, purely illustratively and as shown, a user may wish to obtain a view on a current month's sales figures including gross sales, tax, production or delivery costs, and cost basis, as well as other parameters related to sales activity. In aspects as shown, a user can, for instance, highlight those functional relationships by dragging a cursor or otherwise selecting a set of cells to group together, and form one or more extracted functional object 116. In aspects, selection can include the extraction of set of data elements 136, such as values stored in spreadsheet cells or database entries. In aspects, once a set of data elements 136 are selected, the functional, computational, or other modeling parameters associated with that data can be stored or associated with one or more extracted functional object 116. For instance, modeling module 120 can store associated routines, computations, processes, or other attributes or functional specifications for one or more extracted functional object 116 in set of attributes 122, which can be stored or associated with one or more extracted functional object 116. In aspects, set of attributes 122 can include the identification of or linkage to any routines, interfaces, or other functional or computational resources that will be associated with one or more extracted functional object. According to various embodiments, analytic module 204 of mainframe platform 202, or other resource or platform receiving one or more extracted functional object 116 from modeling client 102 can thereby obtain both data values derived or obtained from set of source data 114, as well as functional or procedural resources and relationships associated with that data. One or more extracted functional object 116 along with any associated set of attributes 122 can be encoded or stored in one or more modeling object 110, which can thereby be transparently exported to mainframe platform 202, middleware server 208, or other platforms or destinations for further modeling operations.

Figure 3:
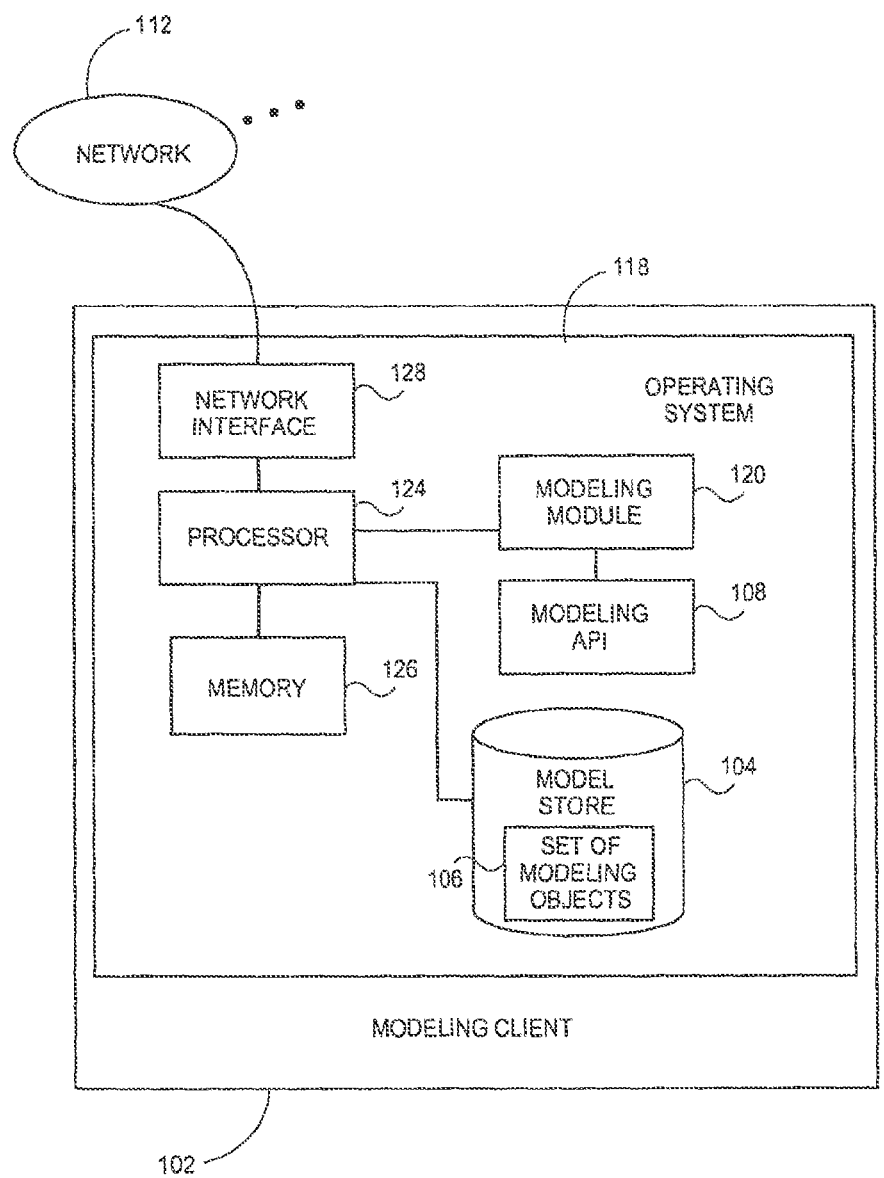
FIG. 3 illustrates an exemplary hardware configuration for a modeling server that can be used in systems and methods for managing sets of modeling objects via a unified management interface, according to various embodiments.

FIG. 3 illustrates an exemplary diagram of hardware, software, connectivity, and other resources that can be incorporated in a modeling client 102 configured to communicate with one or more network 112, including to interface with mainframe platform 202, middleware server 208, and/or other local or remote resources. In embodiments as shown, modeling client 102 can comprise a processor 124 communicating with memory 126, such as electronic random access memory, operating under control of or in conjunction with operating system 118. Operating system 118 can be, for example, a distribution of the Linux™ operating system, the Unix™ operating system, or other open-source or proprietary operating system or platform. Processor 124 also communicates with a model store 104, such as a database stored on a local hard drive, which may store or host set of modeling objects 106. Processor 124 further communicates with network interface 128, such as an Ethernet or wireless data connection, which in turn communicates with one or more networks 112, such as the Internet, or other public or private networks. Processor 124 also communicates with modeling module 120 along with modeling application programming interface (API) 108 and/or other resources or logic, to execute control and perform modeling calculation, translation, data exchange, and other processes described herein. Other configurations of the network modeling client 102, associated network connections, and other hardware and software resources are possible. While FIG. 3 illustrates modeling client 102 as a standalone system comprises a combination of hardware and software, modeling client 102 can also be implemented as a software application or program capable of being executed by a conventional computer platform. Likewise, modeling client 102 can also be implemented as a software module or program module capable of being incorporated in other software applications and programs. In either case, modeling client 102 can be implemented in any type of conventional proprietary or open-source computer language.

Figure 4:
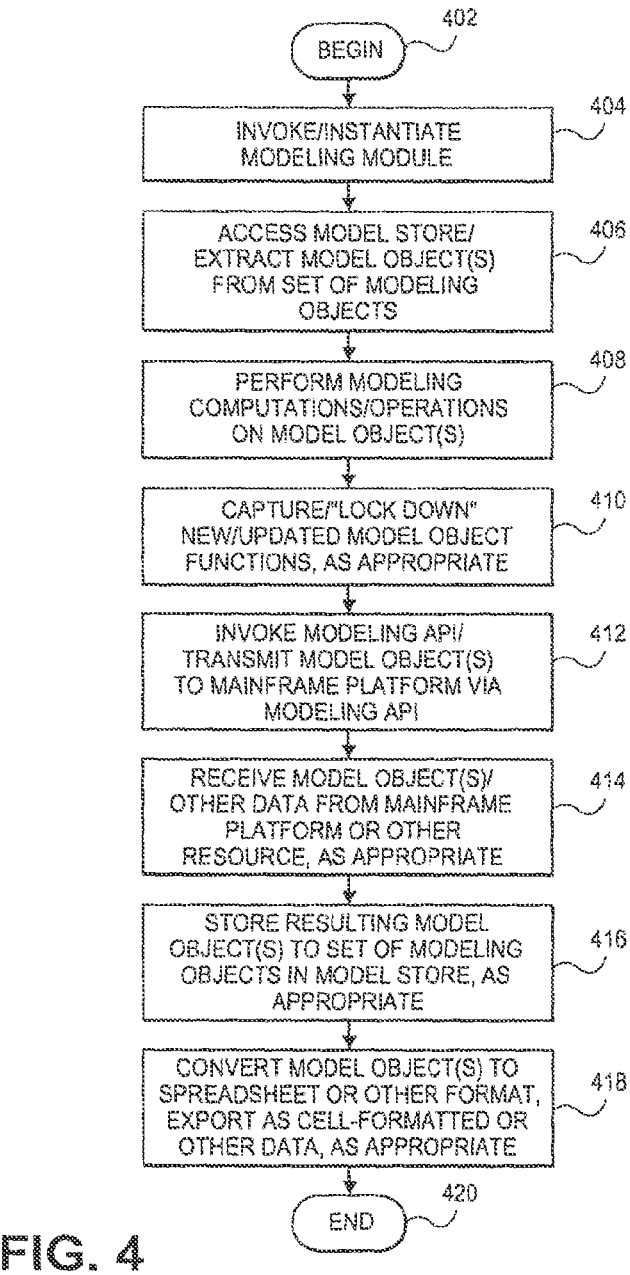
FIG. 4 illustrates a flow diagram of overall modeling processing for object-based modeling that can be used in systems and methods for managing sets of modeling objects via a unified management interface, according to various embodiments.

FIG. 4 illustrates a flow diagram of overall processing that can be used in general systems and methods for managing sets of modeling objects via a unified management interface, according to various embodiments. In 402, processing can begin. In 404, a user of modeling client 102 or other client or device can invoke or instantiate modeling module 120 or other logic, to perform modeling operations. In 406, modeling module 120 can access model store 104 and extract one or more modeling object 110 from set of modeling objects 106. In 408, modeling computations or other operations can be performed on one or more modeling object 110. For example, a modeling operation can be performed to project or predict the output of a factory based on various supply scenarios for parts, materials, energy costs, or other variables. In 410, the values, functions, linkages, or other attributes of one or more data modeling object 110 that were accessed, produced, or modified by the modeling operations can be captured, fixed, or locked down by modeling module 120. For instance, the resulting one or more modeling object 110 can be stored to set of modeling objects 106 in model store 104, or other databases or data stores.

In 412, modeling application programming interface (API) 108 can be invoked by modeling module 120, by mainframe platform 202, or other resources to transfer one or mode modeling object 110 to mainframe platform 202. In embodiments, one or more modeling object 110 can for instance be communicated to mainframe platform 202 via a secure connection or channel, such as a secure socket layer (SSL) connection, via a channel encrypted using a public/private key infrastructure, or other channel or connection. In 414, one or more model object 110 can be received in modeling module 120 from mainframe platform 202 or other resource, as appropriate. For example, an updated version of one or more model object 110 reflecting new data, new modeling results, or other information can be received in modeling module 120. In 416, the resulting new, updated, or modified one or more model object 110 can be stored to set of modeling objects 106 in model store 104, as appropriate. In embodiments, one or more model objects 110 can in addition or instead be stored to mainframe data store 206, to middleware server 208, to another modeling client or other client, or other site or destination. In 418, modeling module 120 can convert one or more model objects 110 to spreadsheet, database, or other format, and export any converted data as a set of cellformatted information, or data encoded in other formats. For instance, modeling module 120 can convert or translate one or more model objects to cell data values or database entries, and export that data to client-level applications on modeling client 102 or other - local or remote devices or storage. In 420, processing can repeat, return to a prior processing point, jump to a further processing point, or end.

Figure 5:
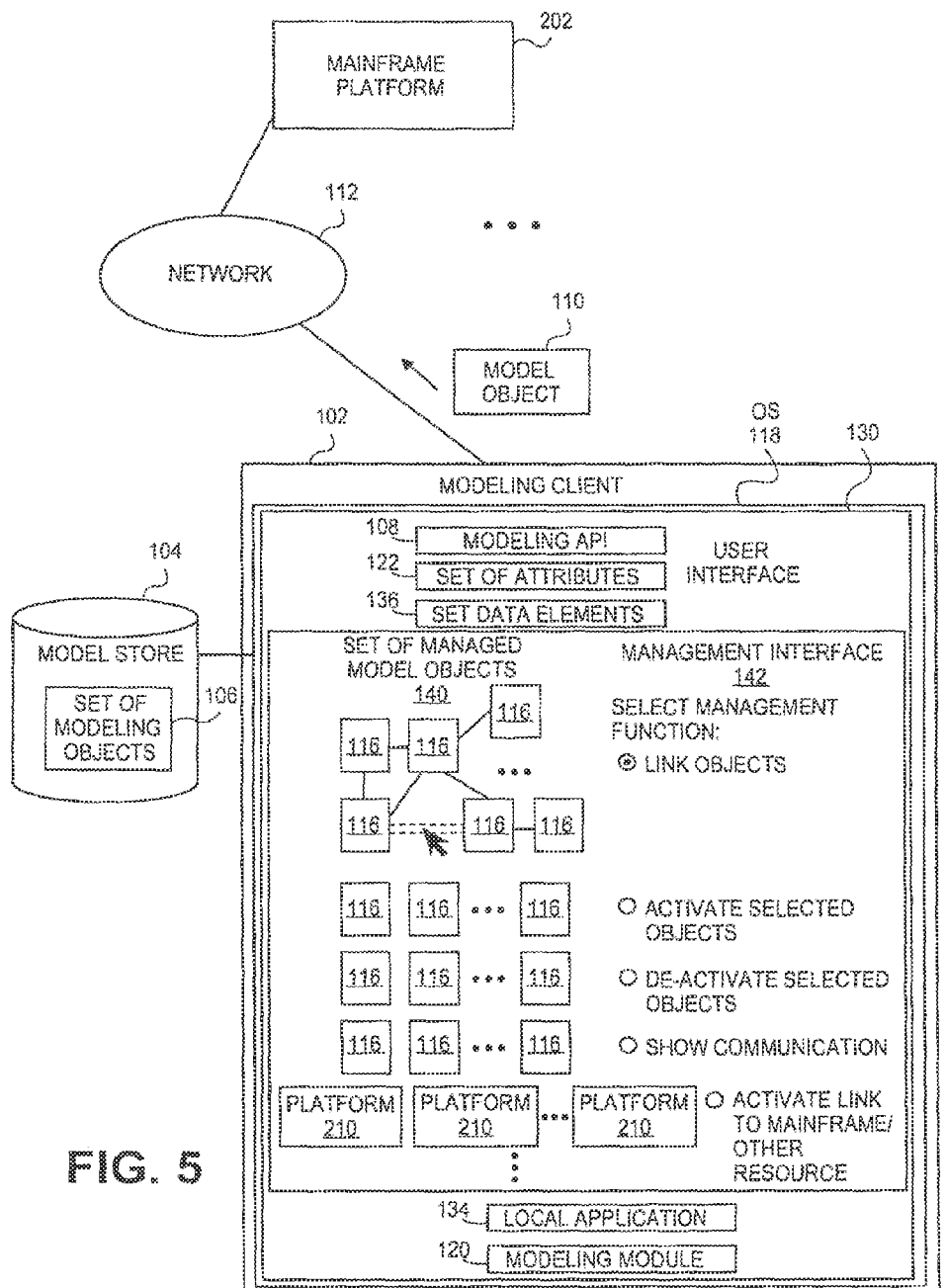
FIG. 5 illustrates exemplary operations to generate sets of modeling objects that can incorporate data messaging pipes between selected objects, according to various embodiments.

According to various embodiments of the present teachings, and as for example generally illustrated in FIG. 5, in implementations modeling module 120 can generate a set of modeling objects, for instance using techniques described herein, which objects can be linked, connected, activated, configured, monitored and/or otherwise managed via a unified management interface. More particularly, in aspects as shown, a set of managed model objects 140 can be generated via modeling client 102 hosting or accessing a management interface 142. In aspects, each object in set of managed model objects 140 can be or include an object similar to model object 110 described herein. Management interface 142 can be or include a graphical, command-line, and/or other interface that can generate a representation of set of managed model objects 140 and a variety of management actions that can be performed on those objects. In aspects, the overall presentation of set of managed model objects 140 and the associated status and configuration of constituent objects can comprise a dashboard-type representation of the activity of the set of managed model objects 140 in one comprehensive view. The ability of management interface 142 to permit a user to arrange and perform management actions on those objects via a unified view, without a need to build or invoke separate object management tools for different data sources, objects, and/or groups of objects, can enhance the efficiency and flexibility of administering set of model objects 140 and related resources.

In aspects, management interface 142 can include or access an object management module and/or other logic and related resources to perform configuration and management of set of managed model objects 140. In aspects, management interface 142 can comprise a module, logic, or layer that is separate from, or can be integrated with, operating system 118 of modeling client 102. According to aspects in various regards, management interface 142 can permit a user to highlight, click, select by radio button or link, or otherwise select or identify one or more objects in set of model objects 140 upon which management actions may be taken. In aspects, management interface 142 can likewise provide options for management actions to be taken on any one or more objects, for instance, an option to drop and drag a new communications link between objects, or a set of platforms 210 such as one or more mainframe platforms, middleware servers, and/or other nodes or resources. In aspects, management interface 142 can permit a user to activate, de-activate, view, and/or otherwise manipulate the status of one or more objects in set of managed objects 140.

For instance, management interface 142 can permit a user to view an active/inactive status of one or more object, a security status of an object (e.g., protected via secure socket layer (SSL) or other mechanism, and/or a communications status of an object, such as a current connection rate or type to other objects, or to a set of platforms 210 such as local or remote mainframe, middleware server, database, and/or other resources. In aspects, management interface 142 can manage set of managed objects 140 on an object-oriented basis, in which classes can be defined which map or associate user inputs to connection links, types, rates, status displays, and/or other actions or resources. In aspects, management interface 142 can be or include an application programming interface (API) layer which permits the instantiation of gadgets, icons, numerical displays, linkages, and/or other interface resources for presentation to the user of modeling client 102 via operating system 118 and/or user interface 130.

Figure 6:
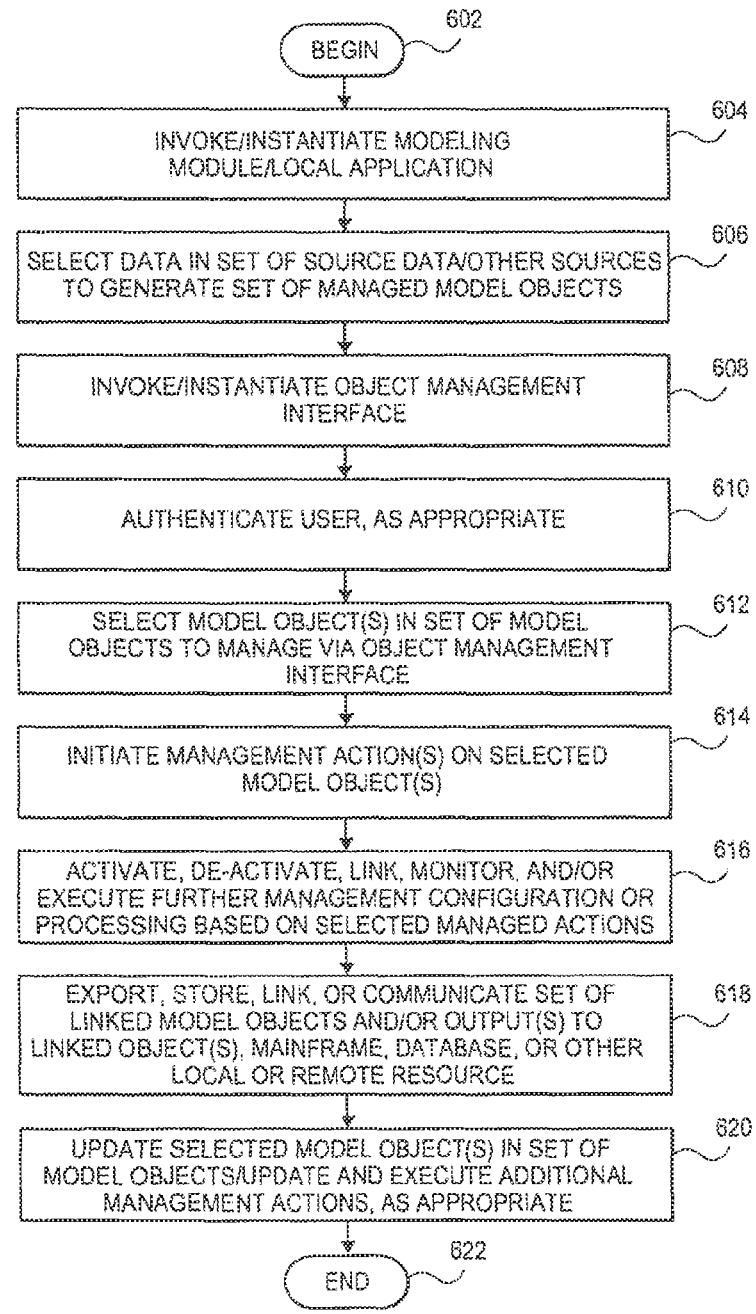
FIG. 6 illustrates a flow diagram of processing to manage sets of model objects via a unified management interface, according to various embodiments.

FIG. 6 illustrates a flow diagram of overall processing to organize, configure and manage set of managed modeling objects 140 via management interface 142, according to various embodiments. In 602, processing can begin. In 604, a user can invoke or initiate modeling module 120 and/or local application 134, such as, for instance, a spreadsheet application, a database application, or other applications or software. In 606, the user can select data in set of source data 114 or other data sources to generate a set of managed model objects 140, each of which can be, include, or be generally similar to model object 110 as described herein, including related data elements and attributes. In 608, the user can invoke or instantiate management interface 142, such as by selecting an icon or entering a command line via operating system 118 of client 102. In 610, the user can be authenticated as appropriate, for instance, via a password challenge or digital certificate, and/or other security mechanism.

In 612, one or more objects in set of managed objects 140 can be selected for management or configuration via management interface 142, for instance by user selection or other activation or selection. In 614, management action on the selected model object(s) can be initiated via management interface 142. In aspects as shown, for instance, one or more objects can be linked, activated, de-activated, have their communication activity displayed, have a link or channel to mainframe or other resources activated, or have other actions or processes applied. In 616, further management configuration and/or other processing can be executed on selected or active objects in set of managed model objects 140 by additional user input or selection, such as further activation, de-activation, linking, monitoring, and/or other management activity on those objects.

In 618, set of managed model objects 140 and/or individual constituent extracted functional objects 116 can be exported, stored, linked, and/or communicated to other linked objects, applications, set of platforms 210 such as mainframe resources, middleware servers, databases, and/or other local or remote services or resources. In 620, the selected model objects in set of managed model objects 140 can be further updated via management interface 142 and further management actions can be executed, as appropriate. In 622, processing can repeat, return to a prior processing point, jump to a further processing point, or end.

The foregoing description is illustrative, and variations in configuration and implementation may occur to persons skilled in the art. For example, while embodiments have been described wherein one or more model object 110 is accessed and manipulated via one modeling client 102, in embodiments, one or more users can use multiple modeling clients, or networks including modeling clients or other resources, to operate on model object data. For further example, while embodiments have been described in which modeling client 102 may interact with one mainframe platform 202 and/or one middleware server 208, in embodiments, one or more modeling client 102 can interact with multiple mainframe platforms, data centers, middleware servers, and/or other resources, in various combinations. Yet further, while embodiments have been described in which a modeling client 102 interacts with a mainframe platform 202 and/or middleware server 208, in embodiments, rather than interact with large-scale mainframe platforms, data centers, or middleware servers, modeling client 102 can interact with other local or remote modeling clients, networks of those clients, or, in embodiments, can operate to perform modeling operations on a stand-alone basis, without necessarily communicating with other modeling platforms. Still further, while embodiments have been described in which one set of managed model objects 140 are managed via one management interface 142, embodiments, multiple sets of model objects can be accessed, organized and managed via multiple instances of management interface 142 or similar resources, for instance via multiple local or remote authorized users. For yet further example, while embodiments have been described in which one set of managed model objects 140 are accessed and controlled, in embodiments, multiple sets, hierarchies, or networks of model objects, any one or more of which may be local or remote, can be organized and managed via a unified management interface. Other resources described as singular or integrated can in embodiments be plural or distributed, and resources described as multiple or distributed can in embodiments be combined. The scope of the present teachings is accordingly intended to be limited only by the following claims.

What is claimed is:

1. A method comprising:
   invoking an application, the application comprising a set of application data, wherein the set of application data comprises a cellular array format;
   selecting a plurality of sets of cells of the set of application data;
   extracting a set of data elements for each set of the plurality of sets of cells and a set of functional relationships for each set of the plurality of sets of cells, the set of functional relationships describing relationships between values of the set of data elements that corresponds to the set of functional relationships;
   encapsulating the set of data elements and the corresponding set of functional relationships for each set of the plurality of sets of cells to create a plurality of predictive model objects, wherein the plurality of predictive model objects are encoded in extensible markup language (XML) format;
   invoking a management interface comprising a representation of the plurality of predictive model objects, wherein the management interface is updated periodically to indicate a status of the plurality of predictive model objects;
   identifying a subset of the plurality of predictive model objects via the management interface; and
   initiating, by a computer system, a management action on the subset of the plurality of predictive model objects in response to user input received via the management interface, wherein the management interface provides a plurality of management actions comprising linking the subset of the plurality of predictive model objects, activating the subset of the plurality of predictive model objects, deactivating the subset of the plurality of predictive model objects, displaying communication activity of the subset of the plurality of predictive model objects, linking the subset of the plurality of predictive model objects to another resource, reporting a communications status of at least one of the plurality of predictive model objects, and reporting a security status of at least one of the plurality of predictive model objects.

2. The method of claim 1, wherein the management interface comprises a graphical user interface, and the plurality of predictive model objects are represented by icons on the graphical user interface.

3. The method of claim 1, wherein the set of application data comprises at least one of spreadsheet data, database data, word processing data, or presentation data.

4. The method of claim 1, wherein the management interface comprises an authentication module to authenticate a user of the management interface.

5. A client system comprising:
   an interface to a set of application data; and
   a processor communicating with the set of application data via the interface, the processor configured to:
   invoke an application, the application comprising the set of application data, wherein the set of application data comprises a cellular array format;
   select a plurality of sets of cells of the set of application data;

extract a set of data elements for each set of the plurality of sets of cells and a set of functional relationships for each set of the plurality of sets of cells, the set of functional relationships describing relationships between values of the set of data elements that corresponds to the set of functional relationships;

encapsulate the set of data elements and the corresponding set of functional relationships for each set of the plurality of sets of cells to create a plurality of predictive model objects, wherein the plurality of predictive model objects are encoded in extensible markup language (XML) format;

invoke a management interface comprising a representation of the plurality of predictive model objects, wherein the management interface is updated periodically to indicate a status of the plurality of predictive model objects;

identify a subset of the plurality of predictive model objects via the management interface; and initiate a management action on the subset of the plurality of predictive model objects in response to user input received via the management interface, wherein the management interface provides a plurality of management actions comprising linking the subset of the plurality of predictive model objects, activating the subset of the plurality of predictive model objects, deactivating the subset of the plurality of predictive model objects, displaying communication activity of the subset of the plurality of predictive model objects, linking the subset of the plurality of predictive model objects to another resource, reporting a communications status of at least one of the plurality of predictive model objects, and reporting a security status of at least one of the plurality of predictive model objects.

6. The system of claim 5, wherein the management interface comprises a graphical user interface, and the plurality of predictive model objects are represented by icons on the graphical user interface.

7. The system of claim 5, wherein the set of application data comprises at least one of spreadsheet data, database data, word processing data, or presentation data.

8. The system of claim 5, wherein the processor is further configured to execute an authentication module to authenticate a user of the management interface.

9. A non-transitory computer-readable medium, including instructions that, when executed by a processor, cause the processor to perform a method comprising:

invoking an application, the application comprising a set of application data, wherein the set of application data comprises a cellular array format;

selecting a plurality of sets of cells of the set of application data;

extracting a set of data elements for each set of the plurality of sets of cells and a set of functional relationships for each set of the plurality of sets of cells, the set of functional relationships describing relationships between values of the set of data elements that corresponds to the set of functional relationships;

encapsulating the set of data elements and the corresponding set of functional relationships for each set of the plurality of sets of cells to create a plurality of predictive model objects, wherein the plurality of predictive model objects are encoded in extensible markup language (XML) format;

invoking a management interface comprising a representation of the plurality of predictive model objects, wherein the management interface is updated periodically to indicate a status of the plurality of predictive model objects;

identifying a subset of the plurality of predictive model objects via the management interface; and initiating, by the processor, a management action on the subset of the plurality of predictive model objects in response to user input received via the management interface, wherein the management interface provides a plurality of management actions comprising linking the subset of the plurality of predictive model objects, activating the subset of the plurality of predictive model objects, deactivating the subset of the plurality of predictive model objects, displaying communication activity of the subset of the plurality of predictive model objects, linking the subset of the plurality of predictive model objects to another resource, reporting a communications status of at least one of the plurality of predictive model objects, and reporting a security status of at least one of the plurality of predictive model objects.

10. The non-transitory computer-readable medium of claim 9, wherein the management interface comprises a graphical user interface, and the plurality of predictive model objects are represented by icons on the graphical user interface.

11. The non-transitory computer-readable medium of claim 9, wherein the management interface is configured to authenticate a user of the management interface.

* * * * *